United States Patent

Tarusawa et al.

[11] Patent Number: 5,812,296
[45] Date of Patent: Sep. 22, 1998

[54] FIBER OPTICS TRANSMISSION SYSTEM

[75] Inventors: Yoshiaki Tarusawa, Yokohama; Toshio Nojima, Yokosuka; Yasushi Ito, Miura, all of Japan

[73] Assignee: NTT Mobile Communications Networks Inc., Tokyo, Japan

[21] Appl. No.: 776,925
[22] PCT Filed: Aug. 22, 1996
[86] PCT No.: PCT/JP96/02340
 § 371 Date: Feb. 11, 1997
 § 102(e) Date: Feb. 11, 1997
[87] PCT Pub. No.: WO97/08856
 PCT Pub. Date: Mar. 6, 1997

[30] Foreign Application Priority Data

Aug. 23, 1995 [JP] Japan .................................. 7-214550
Jun. 12, 1996 [JP] Japan .................................. 8-151014

[51] Int. Cl.⁶ .................................................. H04B 10/12
[52] U.S. Cl. .......................... 359/173; 359/145; 359/164; 359/167; 359/179; 455/517; 375/254
[58] Field of Search .................................. 359/111, 125, 359/127, 145–146, 164, 167, 173, 179; 455/422, 426, 501, 517; 375/254, 278

[56] References Cited

U.S. PATENT DOCUMENTS 4,916,460 4/1990 Powell ..................................... 359/145
5,301,353 4/1994 Barras et al. ........................... 359/145
5,493,436 2/1996 Karasawa et al. ....................... 359/145

FOREIGN PATENT DOCUMENTS 0346925 12/1989 European Pat. Off. ............... 359/145
0143854 11/1980 Japan ..................................... 359/145

OTHER PUBLICATIONS

Chu et al; "Fiber Optic Microcellular Radio", IEEE Transactions on Vehicular Technology, vol. 40, No. 3, Aug. 1991. pp. 559–606.

*Primary Examiner*—Kinfe-Michael Negash
*Attorney, Agent, or Firm*—Pollock, Vande Sande & Priddy

[57] ABSTRACT

In a fiber optics transmission system in which a plurality of access units are cascade-connected via up-link and down-link optical fiber lines and connected to a base unit, the base unit has a beat noise detector and a noise information generator and, upon detection of beat noise, noise information is sent to each access unit over the optical fiber lines. Each access unit has a random signal generator for generating a random value in response to the noise information and a wavelength control circuit for randomly selecting and controlling the oscillation wavelength of a laser diode, and each access unit repeats random wavelength selection until the noise information is reduced.

11 Claims, 10 Drawing Sheets

FIBER OPTICS TRANSMISSION SYSTEM

TECHNICAL FIELD

The present invention relates to a fiber optics transmission system which transmits radio signals over optical fiber lines and, more particularly, to a fiber optics transmission system which is used to build mobile communication systems in underground shopping malls, tunnels and similar radio dead zones.

PRIOR ART

Figure 1:
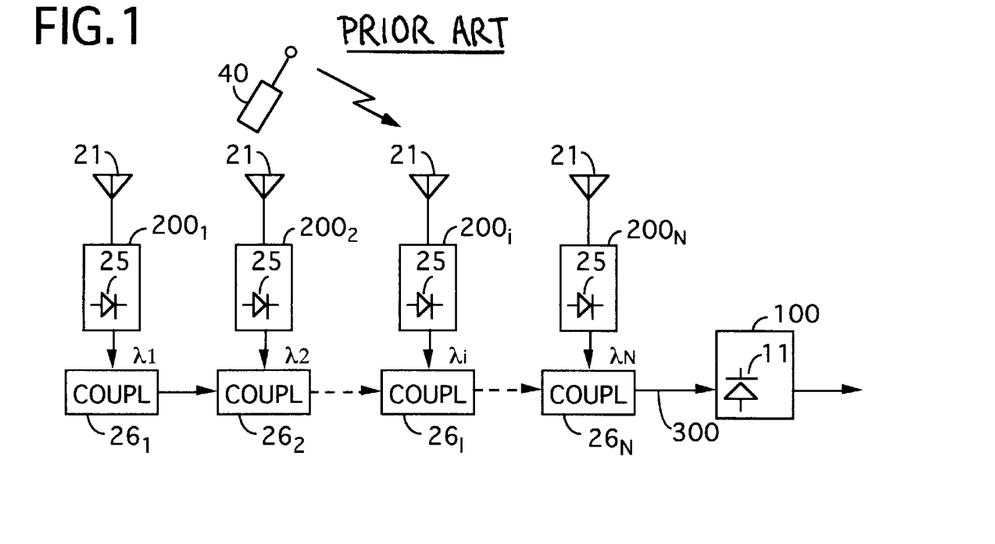
FIG. 1 is a block diagram for explaining a conventional fiber optics transmission system.

As a radio signal transmission system for the use of pocket telephones or similar mobile radios in underground shopping malls, tunnels and like radio blind areas, there has been proposed in Japanese Patent Application Laid-open No. 6-153255 such a fiber optics transmission system as shown in FIG. 1. In this fiber optics transmission system, radio access units $200_1$ to $200_N$ are connected via optical couplers $26_1$ to $26_N$ to an optical fiber line 300, which is, in turn, connected to a base unit 100. Radio frequency signals (hereinafter referred to as RF signals) received by antennas 21 of the radio access units $200_1$ to $200_N$ are fed to semiconductor laser devices 25, each formed by a laser diode, in the access units, wherein the received RF signals are used to intensity-modulate laser light of wavelengths $\lambda_1$ to $\lambda_N$ emitted from the laser diodes. The optical signals of the wavelengths $\lambda_1$ to $\lambda_N$ from the access units $200_1$ to $200_N$ are each provided via an optical coupler onto the optical fiber line 300 and combined with other optical signals one after another, and the combined light is fed to a photodiode 11 of the base unit 100. The photodiode 11 converts the combined light into radio-frequency signals corresponding to the intensity-modulated components of the respective wavelengths, and the base unit 100 sends the radio-frequency signals to base stations not shown.

The oscillation frequencies of the laser diodes of the access units $200_1$ to $200_N$ are chosen so that they are spaced apart to prevent the generation of beat noise by wavelength differences in the working radio-frequency band. By installing such radio access units $200_1$ to $200_N$ in an underground shopping mall or tunnel at suitable intervals so that no blind zones are formed, it is possible to send an up-link RF signal, for example, from a portable telephone 40 to the base station via the nearest access unit $200_1$ the optical fiber line 300 and the base unit 100. In this way, the conventional fiber optics transmission system permits the use of portable telephones or like mobile radios in underground shopping malls.

Figure 2:
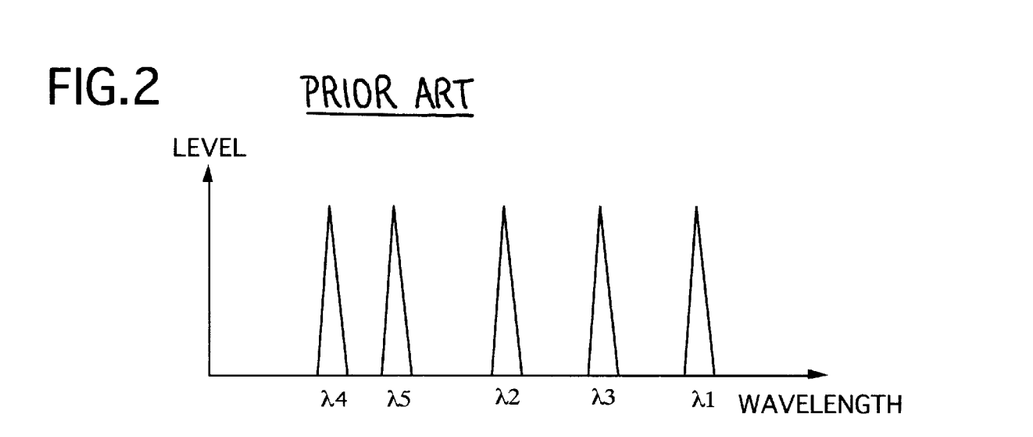
FIG. 2 is a graph showing wavelengths used in the system of FIG. 1.

As described above, in the fiber optics transmission system the optical signals of the wavelengths $\lambda_1$ to $\lambda_N$, emitted from the semiconductor laser devices 25 of the radio access units $200_1$ to $200_N$, are provided onto the optical fiber line 300 and combined with one another and the combined optical signal is fed to the photodiode 11 of the base unit 100, so that the beat noise is generated which results from wavelength differences among the optical signals sent from the radio access units $200_1$ to $200_N$. Assuming, for example, that the semiconductor laser devices 25 of the access units $200_1$ to $200_N$ each oscillate laser light of a 1.3-$\mu$m band and that the wavelength difference between two optical signals is about 0.005 nm, the beat frequency is around 1 GHz, which falls in the using radio frequency band. It is necessary, therefore, in the prior art to set, as shown in FIG. 2, the oscillation wavelengths of the semiconductor laser devices of the radio access units at predetermined wavelength intervals $\Delta\lambda$ or more so that the wavelengths do not overlap lest the beat noise should fall in the radio signal transmission band. To perform this, it is required that N laser diodes, which satisfy the predetermined wavelength spacing, be selected from a large number of purchased laser diodes.

To build such a fiber optics transmission system at low cost, mass-produced commercially available laser diodes need to be used as laser diodes forming the semiconductor laser devices 25. In general, however, the actual oscillation wavelengths of such laser diodes vary, even if in the same wavelength band, because of various kinds of variations occurring in their manufacturing process. In actuality, the oscillation wavelengths of commercially available 1.3-$\mu$m band laser diodes vary in the range of from 1.300 to 1.314 $\mu$m. Conventionally, a set of laser diodes of wavelength spacing greater than a predetermined value are selected from a large number of purchased laser diodes and the selected laser diodes are assigned to the units $200_1$ to $200_N$ to construct the fiber optics transmission system depicted in FIG. 1.

Figure 3:
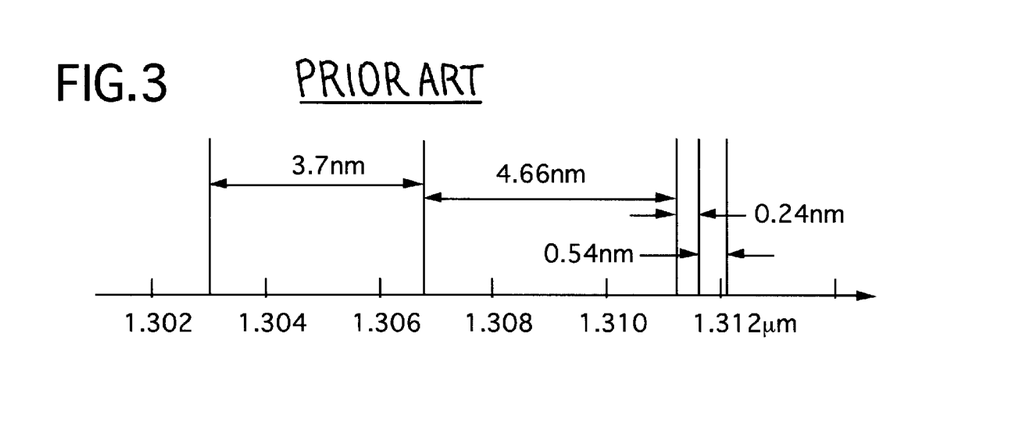
FIG. 3 is a diagram for explaining closely spaced-apart wavelengths.

In such a fiber optics transmission system as shown in FIG. 1, the radio access units $200_1$ to $200_N$ are placed in different temperature environments. On the other hand, the oscillation wavelength of the laser diode varies with temperature; the wavelength deviates approximately 5 to 10 nm from the center wavelength at 0 to 60° C. Further, the oscillation wavelength vs. temperature characteristic of the laser diode varies with aging as well. Hence, there is a possibility that the oscillation wavelengths of the laser diodes in some of the radio access units $200_1$ to $200_N$ come close to adjacent ones of them because of a temperature change and/or aging as shown in FIG. 3, resulting in the beat noise being generated in the radio signal transmission band. The generation of such beat noise in the radio signal transmission band will seriously degrade the C/N characteristic.

The present invention has for its object the provision of a fiber optics transmission system which permits the use of arbitrarily selected commercially available laser diodes in respective access units regardless of temperatures of their use environments and the oscillation wavelength characteristics of the individual laser diodes and which automatically reduces the beat noise.

DISCLOSURE OF THE INVENTION

According to the present invention, there is provided a fiber optics transmission system which comprises: N radio access units each of which converts an up-link radio signal from a mobile radio, received by an antenna, into an up-link optical signal by means of a semiconductor laser device, converts a down-link optical signal intensity-modulated by a down-link radio signal into a down-link radio signal by means of a photodiode and transmits it to the mobile radio through the antenna, N being an integer equal to or greater than 2; up-link and down-link optical fiber lines to which the N radio access units are connected in cascade; and a base unit which converts a down-link radio signal received from a control station into a down-link optical signal, provides it onto the down-link optical fiber line, converts an up-link optical signal received from the up-link optical fiber line into an up-link radio signal and transmits it to the control station; and wherein:

the base unit comprises a noise detector for detecting beat noise, and a noise information generating section for generating noise information representing the presence of the beat noise during its detection and for sending the noise information to the N radio access unit over the down-link optical fiber line; and the radio access units each comprises a random signal generator for repeatedly generating a random value during the presence of the noise information, and a wavelength control circuit for controlling the semiconductor laser device to randomly select one of at least N wavelengths spaced a predetermined value or more apart in accordance with the random value.

With this configuration, the N radio access units each repeat independently selecting, based on the random value, the wavelength of the up-link optical signal to be provided onto the up-link optical fiber line, by which automatic control is effected to reduce the beat noise.

BEST MODE FOR CARRYING OUT THE INVENTION

Figure 4:
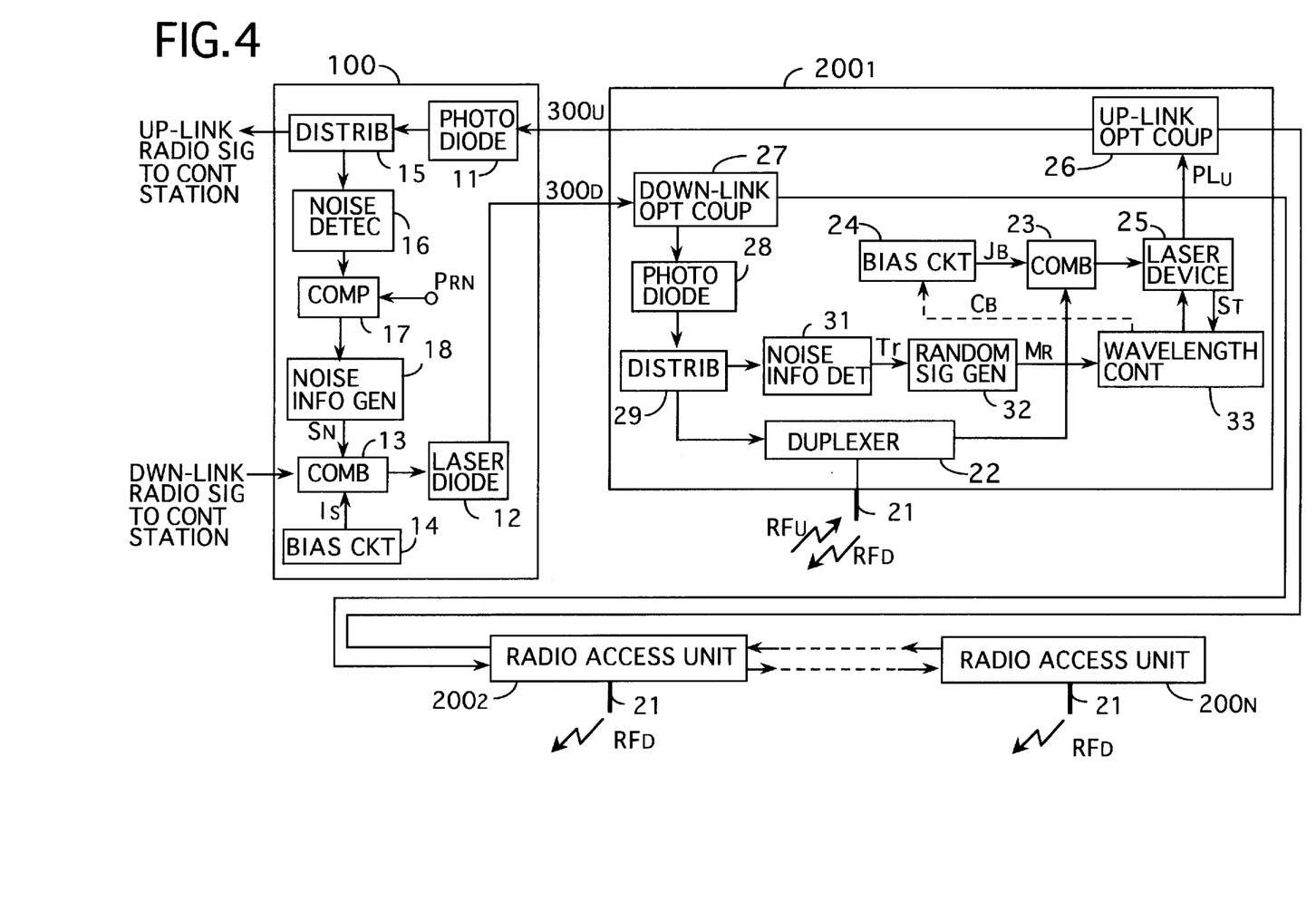
FIG. 4 is a block diagram for explaining an embodiment of the present invention.

In FIG. 4 there is illustrated an embodiment of the fiber optics transmission system according to the present invention. As shown, the fiber optics transmission system of the present invention is made up of a base unit 100, N radio access units $200_1$ $200_2$, ..., $200_N$ and a pair of optical fiber lines $300_U$ (up-link) and $300_D$ (down-link). The radio access units $200_1$ to $200_N$ and the base unit 100 are cascade-connected via the two optical fiber lines $300_U$ and $300_D$. The base unit 100 is connected via a radio transmission channel to one of base stations of a mobile communication system. The radio access units $200_1$ to $200_N$ are installed at intervals of 50 to 100 m in an underground shopping mall, for instance.

An up-link radio signal $RF_U$ transmitted from a portable telephone or the like in the underground shopping mall is received by an antenna 21 of the nearest radio access unit, for example, $200_1$ and is converted into an up-link optical signal $PL_U$ by a semiconductor laser device 25 formed by a laser diode. At this time, the up-link optical signal $PL_U$ is intensity-modulated by an up-link radio signal. The up-link optical signal $PL_U$ is coupled by an optical coupler 26 to the up-link optical fiber line $300_U$. The base unit 100 receives combined light from the N radio access units $200_1$ to $200_N$ and collectively recovers therefrom up-link radio signals by means of a photodiode 11. In this way, the up-link radio signal is sent to a control station (the base station, for instance).

On the other hand, a down-link radio signal generated in the control station is converted by the semiconductor laser device in the base unit 100 into a down-link optical signal for transmission to the radio access units $200_1$ to $200_N$. The down-link optical signal is sent to each of the radio access units $200_1$ to $200_N$ over the down-link optical fiber line $300_D$. The radio access units $200_1$ to $200_N$ each distribute the down-link optical signal by an optical coupler 27 inserted in the down-link optical fiber line $300_D$. Further, a down-link radio signal $RF_D$ is recovered by a photodiode 28 from the down-link optical signal, which is transmitted via the antenna 21. Reference numeral 22 denotes a duplexer for using the antenna 21 for both of transmission and reception, and 23, 24 and 13, 14 denote bias circuits which provide bias currents for driving the semiconductor laser devices 12 and 25 and combiner circuits for modulating the bias currents by radio signals.

According to the present invention, the photodiode of the base unit 100 receives the combined light signal of the optical signals from the access units $200_1$ to $200_N$ and converts it into an up-link radio signal of the radio transmission band; when a beat falling in the working radio transmission band is generated due to a difference between laser oscillation wavelengths in two access units, the base unit 100 detects it and sends the detection signal to the respective access units $2001$ to $200_N$, each of which repeats randomly changing the laser oscillation wavelength independently of the others until the beat detection signal disappears. To this end, the base unit 100 is provided with a distribution circuit 15, a noise detector 16, a comparator 17 and a noise information generating section 18, and the radio access units $2001$ to $200_N$ are each provided with a distribution circuit 29, a noise information detector 31, a random signal generator 32 and a wavelength control circuit 33.

Figure 5:
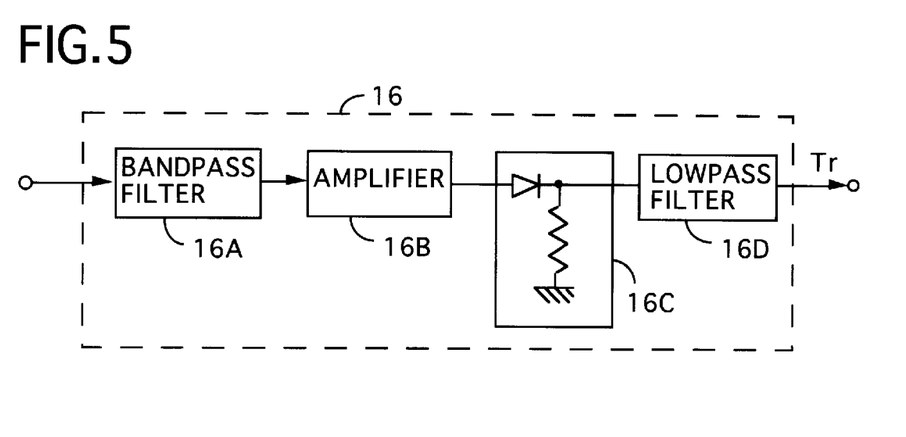
FIG. 5 is a block diagram illustrating an example of a noise detector for use in the present invention.

The distribution circuit 15 in the base unit 100 distributes the up-link radio signal from the photodiode 11 to the control station side and the noise detector 16. For example, as shown in FIG. 5, the noise detector 16 can be formed by a cascade-connection of a band-pass filter 16A, an amplifier 16B, a diode detector 16C and a low-pass filter 16D. The pass band of the band-pass filter 16A is chosen to be a noise detecting band 6b set up in the proximity of a radio signal transmission band 6a (See FIG. 6). With the pass band of the band-pass filter chosen outside the radio signal transmission band, it is possible to detect the beat noise independently of the up-link radio signal.

Thus, it is necessary to make provision for preventing the generation of beat noise in the radio signal transmission band over the up-link optical fiber line $300_U$, that is, for preventing the laser oscillation wavelengths in the radio access units $200_1$ to $200_N$ from becoming too close to one another. However, the oscillation wavelengths of the laser diodes 25 vary with an ambient temperature change or aging and when the oscillation wavelengths of the laser diodes in two radio access units become close to each other, beat noise is generated in the radio signal transmission band.

Figure 6:
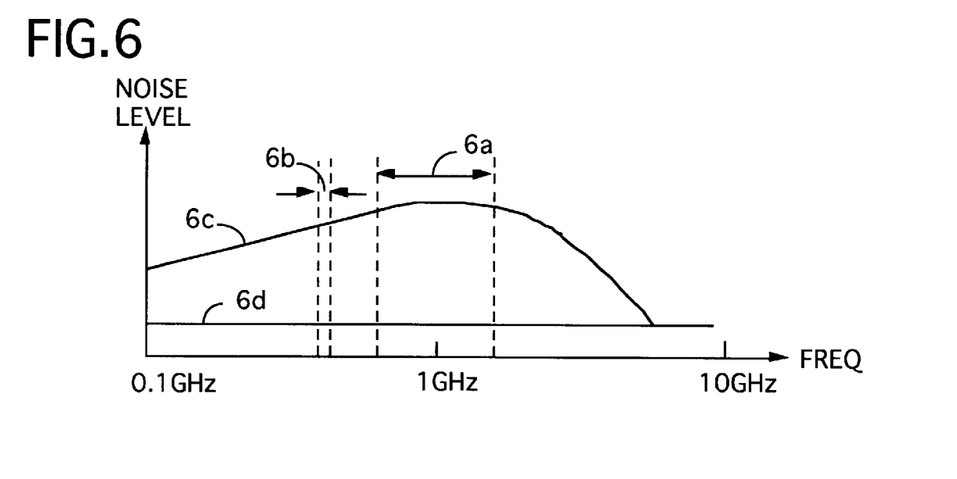
FIG. 6 is a graph for explaining the detection of beat noise in the present invention.
Figure 7:
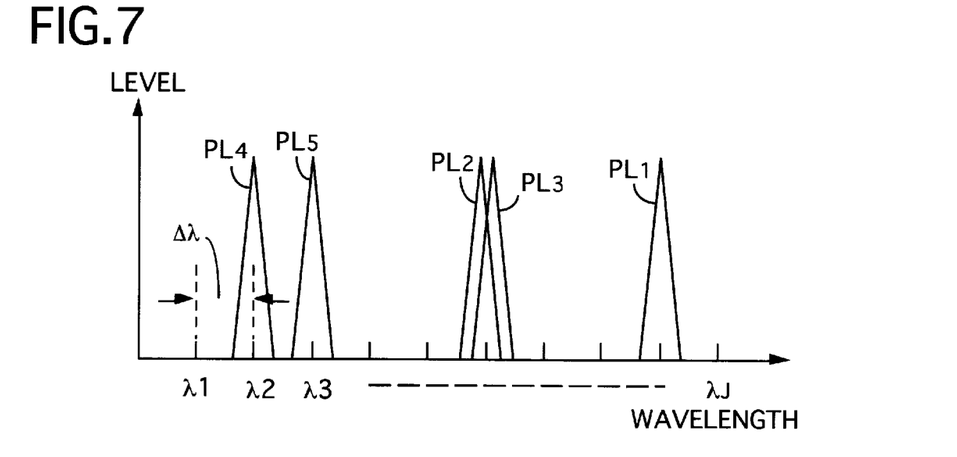
FIG. 7 is a graph for explaining wavelengths for use in the present invention.

For example, as the oscillation wavelengths of the up-link optical signals $PL_2$ and $PL_3$ generated in the radio access units $200_2$ and $200_3$ come close to each other as depicted in FIG. 7, noise will increase over the entire radio signal transmission band as shown in FIG. 6 when the up-link optical signals are converted by the photodiode 11 of the base unit 100 into radio signals. In general, the oscillation spectra of the laser diodes spread as indicated by $PL_1$ to $PL_5$ in FIG. 7. Hence, when the oscillation wavelength of two arbitrary laser diodes come close to each other, the frequency component 6c of the resulting beat noise is distributed over a wide band including the working radio signal transmission band 6a as shown in FIG. 6. Accordingly, the beat noise can be detected by the detection of the noise level in the frequency band adjacent the radio signal transmission band in the base unit 100. Incidentally, the level of the beat noise 6c is shown in FIG. 6 to drop at about 10 GHz—this means that the response frequency of the photodiode 11 is up to around 10 GHz.

A noise level signal from the noise detector 16 is compared by the comparator 17 with a reference value $P_{RN}$. When the noise level is higher than the reference value $P_{RN}$, the comparator 17 generates, for example, an H-logic detection signal, which is fed to the noise information generating section 18 to start it.

Figure 8:
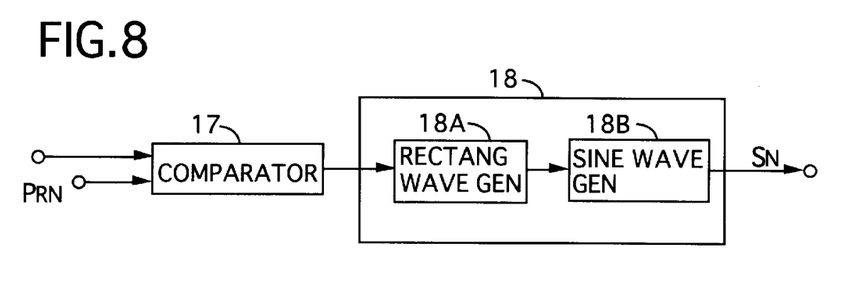
FIG. 8 is a block diagram illustrating an example of a noise information generating section for use in the present invention.

The noise information generating section 18 is, in this example, made up of a rectangular wave generator 18A and a sine wave generator 18B as shown in FIG. 8. The rectangular wave generator 18A generates a rectangular wave of a period T shown in FIG. 9 Row A. The period T is chosen longer than a time constant for a temperature-oscillation wavelength variation of the laser diode 25 in each of the radio access units $200_1$ to $200_N$. The meaning of such a choice of the period T will become apparent from the description given later on of the operation of a wavelength control circuit 33.

Figure 9:
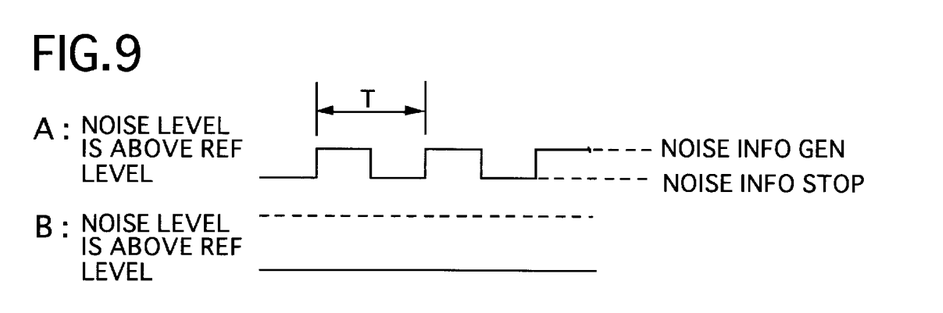
FIG. 9 is a waveform diagram for explaining the operation of the present invention.

The sine wave generator 18B generates a sine wave, for example, only while the rectangular wave generator 18A yields the H-logic output, and hence it intermittently outputs the sine wave as noise information $S_N$. FIG. 9 Row B shows the output from the rectangular wave generator 18A when the noise level is lower than the reference value $P_{RN}$.

The noise information signal SN thus generated in the noise information generating section 18 is combined with a down-link radio signal that is sent from the control station side to the combiner 13, and the combined signal is used to intensity-modulate a bias current $I_B$ being applied from the bias circuit 14 to the semiconductor laser device 12. The optical signal thus added with the noise information signal $S_N$ is sent onto the down-link optical fiber line $300_D$.

The radio access units $200_1$ to $200_N$ each branch the down-link optical signal sent over the down-link optical fiber line $300_D$ by the down-link optical coupler 27 and converts it by the photodiode 28 into a radio signal and the noise information signal. The radio signal thus converted by the photodiode 28 is fed by the distribution circuit 29 to the duplexer 22 and transmitted as the down-link radio signal $RF_D$ via the antenna 21. The noise information signal converted by the photodiode 28 is fed to the noise information detector 31, by which the presence or absence of the noise information $S_N$ is always monitored.

Figure 10:
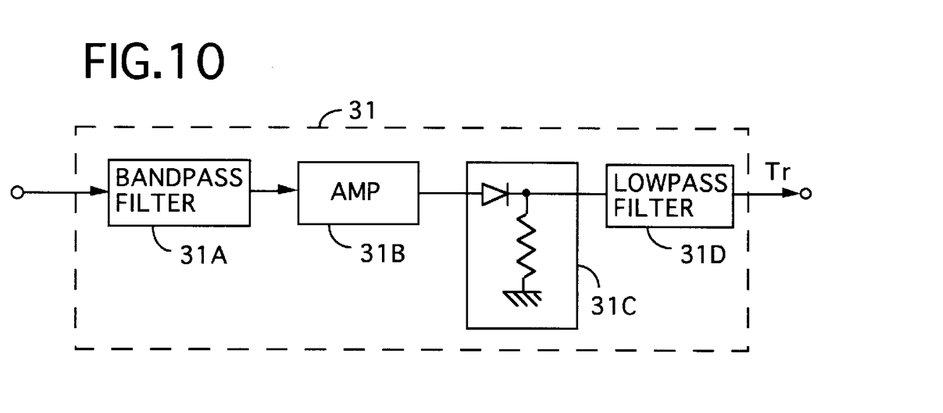
FIG. 10 is a block diagram showing an example of a noise information detector for use in the present invention.

The noise information detector 31 can be formed, for example, by a cascade connection of a band-pass filter 31A, an amplifier 31B, a diode detector 31C and a low-pass filter 31D as shown in FIG. 10. The center frequency of the band-pass filter 31A is chosen to be the same as the frequency of the sine wave that is generated by the sine wave generator 18B in the noise information generating section 18 of the base unit 100. Accordingly, when intermittently supplied with the noise information $S_N$, the band-pass filter 31A intermittently outputs the sine-wave signal corresponding to the noise information. The sine-wave signal is amplified by the amplifier 31B up to a required level and detected by the diode detector 31C and the detected output is taken out via the low-pass filter 31D, by which is recovered at the output of the low-pass filter 31D a rectangular wave of the same period T as that of the rectangular wave (FIG. 9 Row A) that is generated by the rectangular generator 18A in the noise information generating section 18 of the base unit 100.

The thus recovered rectangular wave is fed to the random signal generator 32. When the noise information detector 31 outputs a rectangular wave Tr representing noise information "present," the random signal generator 32 is triggered, for example, upon each rise of the rectangular wave, repeating updating the random value.

Figure 11A:
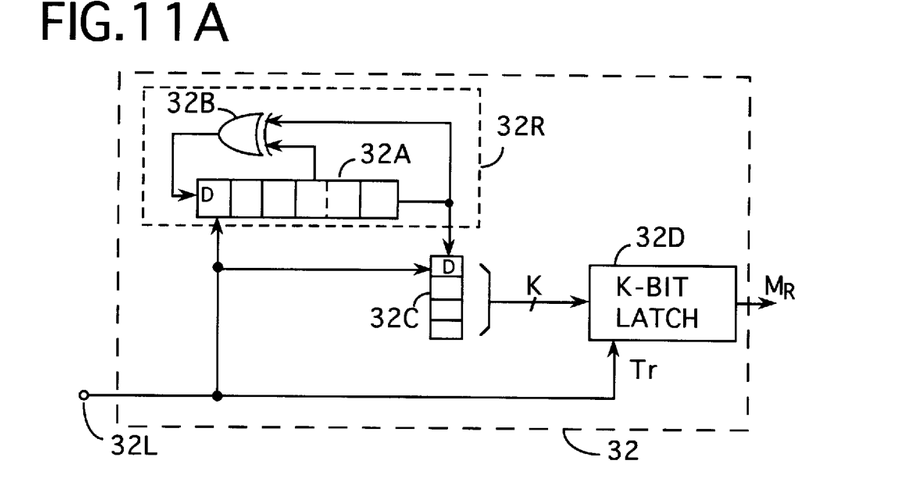
FIG. 11A is a block diagram showing an example of a random signal generator for use in the present invention.

The random signal generator 32 has, for example, a pseudo-random sequence generator 32R made up of an M-bit shift register 32A which is shifted one bit upon each rise of the recovered rectangular wave fed to a terminal 32L and a feedback gate circuit (an exclusive OR circuit) 32B as shown in FIG. 11A. Each bit of the pseudo-random sequence that is generated by the pseudo-random sequence generator 32R is taken in a K-bit shift register 32C upon each rise of the rectangular wave. The value K is chosen to be the minimum integer that satisfies, for example, $2^k-1 \geq J$, where J is the number of oscillation wavelengths $\lambda i$ (i=1,2, . . . ,J) that can be selected for each laser diode, and the value J is chosen to be an integer equal to or greater than the number N of the access units. Assuming that the oscillation wavelength spacing $\Delta\lambda$ is constant, the time needed until the beat noise disappears can be reduced with an increase in the value J.

A K-bit latch circuit 32D latches, as a parallel signal, a random signal of K bits from K shift stages of the K-bit shift register 32C upon each rise of the rectangular wave signal Tr. Consequently, when the generation of the beat noise in the working radio transmission band is detected at the base unit 100 side, the rectangular wave Tr is fed to a trigger terminal of the K-bit latch circuit 32D during the detection of the beat noise, whereby the value of the random signal is updated every period T of the rectangular wave. The parallel K-bit signal latched by the random signal generator 32 is provided as a random value $M_R$ to the wavelength control circuit 33.

Figure 11B:
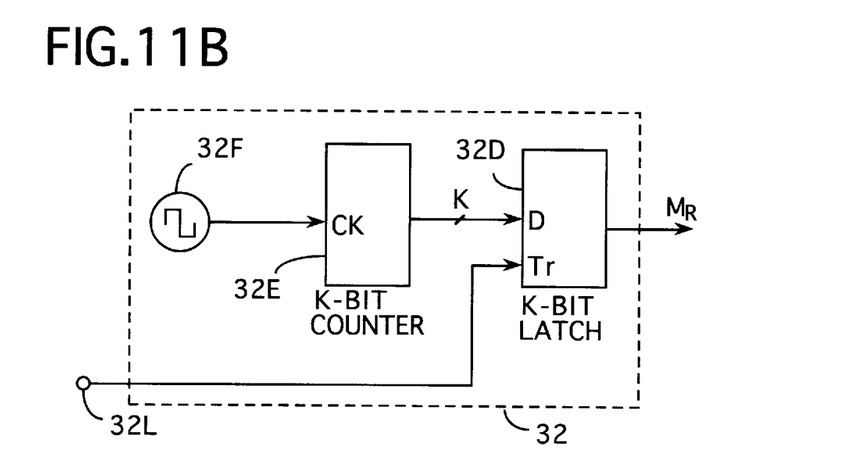
FIG. 11B is a block diagram showing another example of the random signal generator.

While in FIG. 11A the random signal generator 32 is shown to be formed using a known pseudo-random sequence generator, it can also be formed in such a simpler configuration as shown in FIG. 11B. That is, the random signal generators 32 of the respective access units $200_1$ to $200_N$ are provided with clock generators 32F which generate clock signals of periods shorter than T of the rectangular wave signal and of different clock frequencies $f_{c1}, f_{c2}, \ldots, f_{cn}$. The clock signals that are generated by the clock generator 32F in each access unit are counted by a K-bit counter 32E at all times. When the rectangular wave signal Tr indicating the detection of the beat noise is applied to the terminal 32L, the K-bit latch 32D latches the count value of the K-bit counter 32E upon each rise of the rectangular wave and provides it as the random value $M_R$ to the wavelength control circuit 33. In this modification the period of the rectangular wave signal used as a trigger signal for the latch 32D and the period of the clock signal generated by the clock generator 32F are asynchronous to each other, so that the K-bit count value, which is latched upon each rise of the rectangular wave, can be regarded as a random value.

The oscillation wavelength of the laser diode can be set to a desired value by a method according to which a heat source element capable of generating and absorbing heat, such as a Peltier element, is controlled by the wavelength control circuit 33 to directly vary the temperature of the laser diode of the laser device in FIG. 4 to set its oscillation wavelength to an arbitrary value, or a method according to which the bias circuit 24 is controlled by the wavelength control circuit 33 as indicated by the broken line to vary the bias current $I_B$ to be fed to the laser diode to set its oscillation wavelength to a desired value.

A description will be given first of the method which controls the oscillation wavelength of the laser diode by controlling its temperature. Even if the bias current is constant, the oscillation wavelength of the laser diode increases with an increase in its temperature as depicted, for example, in FIG. 12 which is a schematic graph showing the relationship between temperature and wavelength represented on the abscissa and the left-hand ordinate, respectively. In view of this, at least N or usually J different temperature values $T_1$ to $T_J$, where $J \geq N$, are determined for each laser diode at intervals such that beats by adjacent oscillation wavelengths at these temperatures do not fall in the working radio transmission band. It is easy to determine the set of such temperature values $T_1$ to $T_J$ in common to all the laser diodes, but a different set of temperature values may also be chosen for each laser diode. Even if the set of J temperature values is determined in common to all of the laser diodes, they will not always oscillate at the same wavelength at the same temperature $T_i$ because of dispersion in their characteristics and their oscillation wavelengths need not be same.

Figure 12:
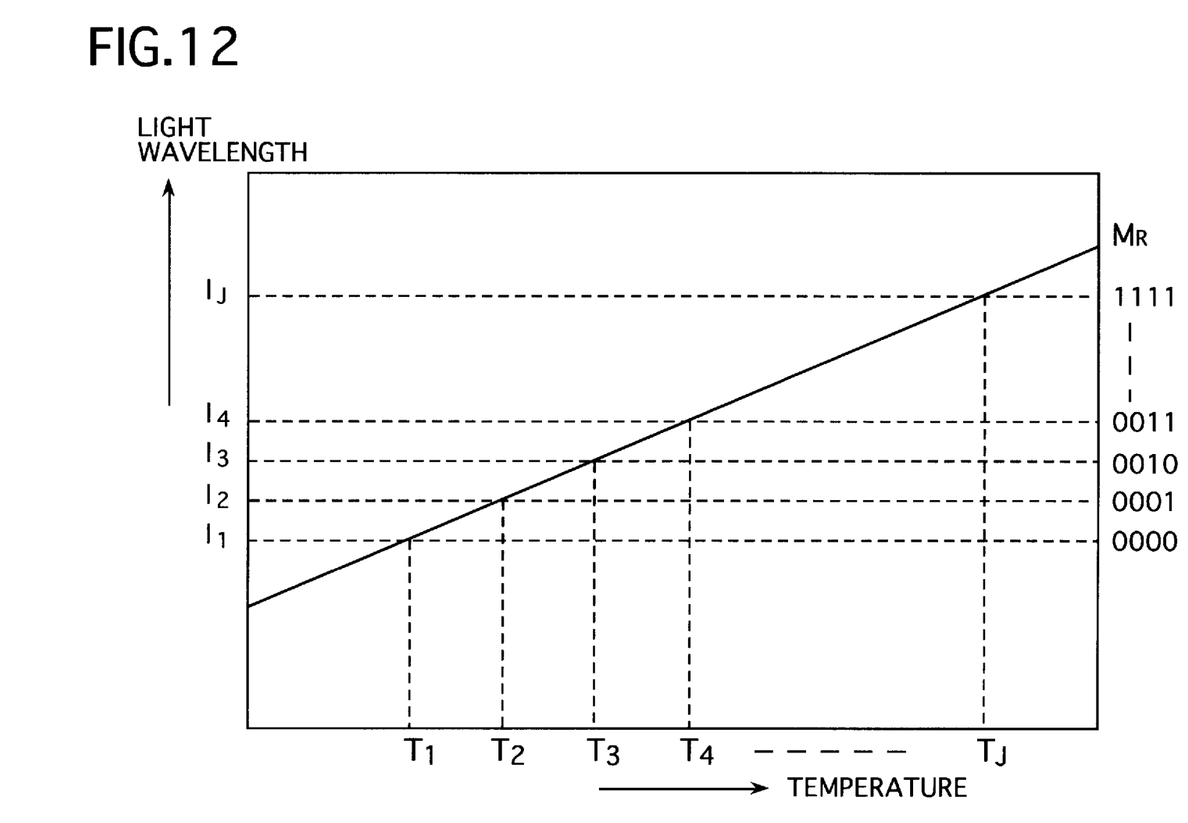
FIG. 12 is a graph showing an example of the oscillation wavelength characteristic of a laser diode with respect to temperature.

Random values $M_R$ corresponding to such J temperatures are determined as indicated on the right-hand ordinate of the graph in FIG. 12. The random values $M_R$ need only to have a one-to-one correspondence with the temperatures $T_i$ and their magnitudes may be arbitrarily sequenced. The wavelength control circuit 33 in each access unit selects that one of the J temperature values $T_1$ to $T_J$ which corresponds to the random value $M_R$ and controls the laser diode in that access unit to reach the selected temperature.

Figure 13:
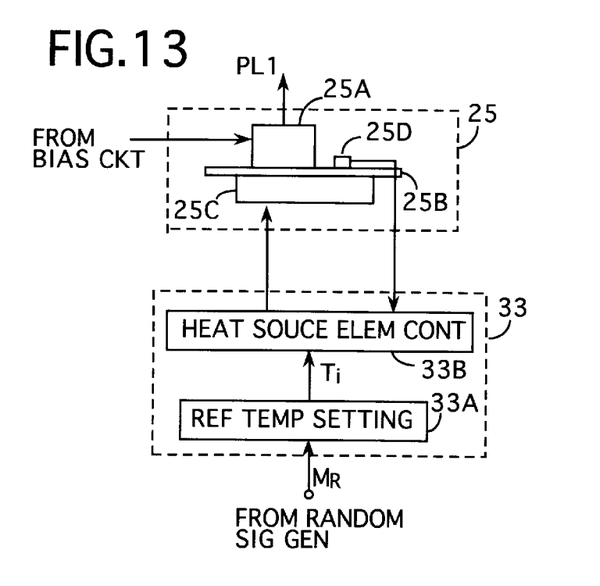
FIG. 13 is a block diagram illustrating an example of a wavelength control circuit for use in the present invention.

FIG. 13 illustrates an example of the wavelength control circuit 33 which uses a heat source element to control the temperature of the semiconductor laser device 25 to set the laser oscillation wavelength at an arbitrary value. The laser device 25 is made up of a laser diode 25A mounted on a base plate 25B of high thermal conductivity, a heat source element 25C closely contacted with the base plate 25B, and a temperature sensor 25D mounted on the base plate in proximity of the laser diode 25A. On the other hand, the wavelength control circuit 33 comprises a reference temperature setting circuit 33A and a heat source element control circuit 33B. The heat source element control circuit 33B controls the heat generating (heat absorbing) temperature of the heat source element 25C such as a Peltier element.

The reference temperature setting circuit 33A has a conversion table in which 16 values from the minimum value "0000" to the maximum value "1111" of a numerical value of K=4 bits, for instance, have a one-to-one correspondence with 16 temperatures obtained by dividing a temperature range, for example, from 15° C. to +30° C. into 15 equal values, as shown in FIG. 12; this circuit converts, for example, the random value $M_R$ of, for example, four bits from the random signal generator 32 into the reference temperature $T_i$ and provides it to the heat source element control circuit 33B. The heat source element control circuit 33B compares the temperature value $T_i$ thus fed thereto and the temperature of the laser diode 25A detected by the temperature sensor 25D and effects automatic control for controlling the temperature of the heat source element 25C to keep the temperature of the laser diode 25A equal to the temperature value $T_i$.

The reference temperature $T_i$ set by the reference temperature setting circuit 33A is updated with a value corresponding to the random value $M_R$ that is provided from the random signal generator 32 with the period T of the rectangular wave. Since the period T is set to a time (about one minute, for instance) longer than the time constant of the temperature-oscillation wavelength change of each laser diode 25A as described previously herein, the temperatures of the laser diodes 25A change to the reference temperatures $T_i$ randomly set by the reference temperature setting circuits 33A in the access units $200_1$ to $200_N$ and when the beat noise is no longer detected at the base unit 100 side as the result of the laser oscillation wavelengths having changed to the newly set wavelengths, the generation of the noise information is stopped and the updating of the random signals $M_R$ is also stopped. When the beat noise is still detected, the noise information is sent from the base unit 100 side correspondingly and the random signal updating operation is repeated.

Figure 14A:
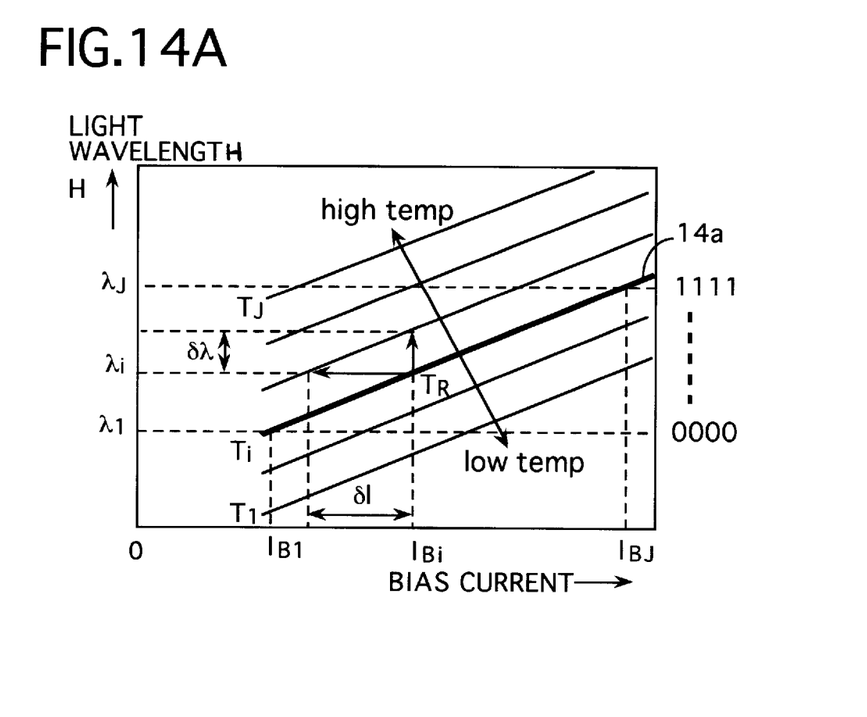
FIG. 14A is a graph showing the characteristic of the laser diode, for explaining the principle of correcting the oscillation wavelength.
Figure 14B:
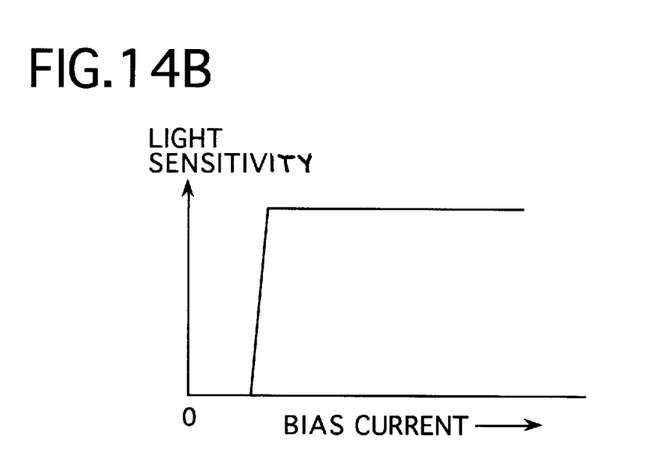
FIG. 14B is a graph showing the photosensitivity of the laser diode.

In the above example of wavelength control, the temperature of the laser diode is controlled through utilization of the linear relationship between temperature and the laser oscillation wavelength shown in FIG. 12. Next, a description will be given of controlling the oscillation wavelength of the laser diode by controlling the bias current that is fed thereto. The oscillation wavelength of the laser diode and the bias current bear substantially a linear relationship as indicated by the thick line 14a in FIG. 14A when temperature is constant. In this example, therefore, the bias current range from $I_{B1}$ to $I_{BJ}$, which spans J wavelengths $\lambda_1$ to $\lambda_J$ distributed over the wavelength range covered by the thick straight line, is set starting at a bias current at which the bias current vs. light emitting sensitivity (optical output power per unit current) characteristic becomes constant as shown in FIG. 14B. In this example, the bias current range is divided into 15 sections, for which bias current values $I_{B1}, I_{B2}, \ldots, I_{BJ}$ are predetermined, and random values "0000" to "1111" are made to correspond to the bias current values, respectively.

Figure 15:
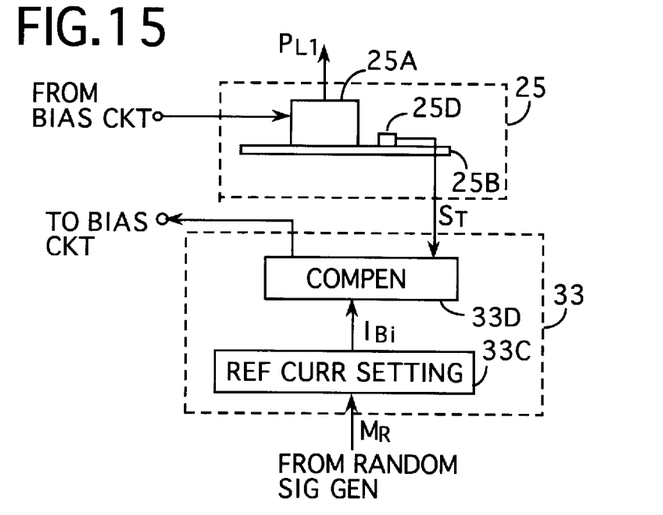
FIG. 15 is a block diagram illustrating an example of the wavelength control circuit for use in a modified form of the FIG. 4 embodiment which controls a bias current.

In FIG. 15 there is illustrated the configurations of the wavelength control circuit 33 and the semiconductor laser device 25 in the case of controlling the laser oscillation wavelength through control of the bias current. In this example, however, they are so configured as to suppress temperature variations of the laser diode which would otherwise cause wavelength variations. The wavelength control circuit 33 has a reference current setting circuit 33C and a compensating circuit 33D, whereas the semiconductor laser device 25 has a substrate 25B and a laser diode 25A and a temperature sensor 25D both mounted thereon. As referred to previously with reference to FIG. 14A, the reference current setting circuit 33C has a conversion table which represents the relationships between the J random values $M_R$ from "0000" to "1111" predetermined in a one-to-one correspondence with the J wavelengths $\lambda_1$ to $\lambda_J$ distributed over the predetermined wavelength range and the bias currents $I_{B1}$ to $I_{BJ}$ corresponding to the random values, respectively; the reference current setting circuit provides, as a reference current value, the bias current value (an analog value) $I_{Bi}$ corresponding to the random value $M_R$ thereto to the compensating circuit 33D.

Figure 16:
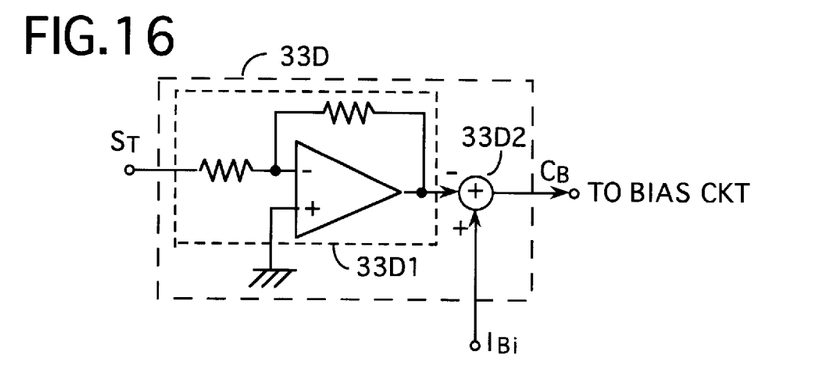
FIG. 16 is a circuit diagram of a compensating circuit in FIG. 15.

The compensating circuit 33D is made up of an operational amplifier 33D1 and an adder 33D2 as shown in FIG. 16. The operational amplifier 33D1, formed by an inverting amplifier, has its gain set at −0.01 nm/10° C. when the oscillation wavelength of the laser diode 25A changes at a rate of +0.01 nm/10° C., for instance. The detected temperature $S_T$ from the temperature sensor 25D is input into the operational amplifier 33D1, in which it is inverted and amplified with the preset gain, thereafter being applied to the adder 33D2 for addition with the reference current $I_{Bi}$ from the reference current setting circuit 33C. Consequently, the adder 33D2 subtracts from the reference current value $I_{Bi}$ a value proportional to the temperature of the laser diode 25A. By subtracting the temperature $S_T$ detected by the temperature sensor 25D, the bias current is so adjusted as to suppress variations in the laser oscillation wavelength attributable to temperature changes of the laser diode. For example, when the oscillation wavelength increases with an increase in ambient temperature, the bias current is controlled to reduce the oscillation wavelength. The output $C_B$ from the adder 33D2 is provided as a temperature-compensated reference current value to the bias circuit 24 (FIG. 4), which supplies the laser diode 25A with a bias current corresponding to the reference current value.

Figure 17:
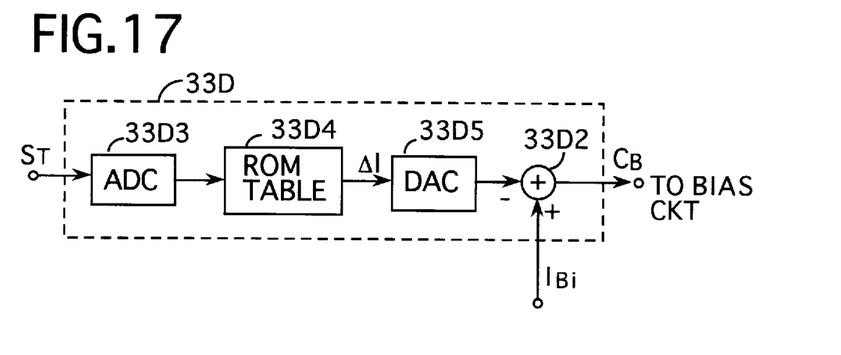
FIG. 17 is a block diagram illustrating another example of the wavelength control circuit in the modification which controls a bias current.

With a view to making more accurate temperature compensation, the compensating circuit 33D in FIG. 15 may also be formed using an AD converter 33D3, a ROM table 33D4 formed by a ROM, a DA converter 33D5 and a subtractor 33D2 as depicted in FIG. 17. While the bias current and the laser oscillation wavelength bear substantially a linear relationship as shown in FIG. 14A, the straight line representing relationship will translate when the temperature changes. Now, let it be assumed that the reference temperature $T_R$ is, for example, 25° C. and that the straight line representing the bias current vs. oscillation wavelength characteristic at that temperature is the thick line 14a in FIG. 14A. Provided that the temperature $S_T$ detected by the temperature sensor 25D is higher than the reference temperature $T_R$ by $\delta T$ degrees when the bias current $I_{Bi}$ is applied, the oscillation wavelength becomes longer than $\lambda_i$ by $\delta\lambda$ as shown in FIG. 14A. Hence, the oscillation wavelength can be corrected to $\lambda_i$ by decreasing the bias current $I_{Bi}$ by $\delta I$.

As will be seen from FIG. 14A, $\delta T/\delta I$ corresponds to the gradient $\delta\lambda/\delta I$ of the straight line and is constant. By setting $\delta I/\delta T=\Theta$ (constant) and by decreasing the bias current $I_B$ by $(S_T-T_R)\Theta=\Delta I$ at the temperature $S_T$ of the laser diode 25A detected by the temperature sensor 25D, the oscillation wavelength of the laser diode can always be corrected to the same wavelength as that $\lambda_i$ at the reference temperature $T_R$. Since $T_R$ and K are predetermined values, the amount of correction of the bias current, $\Delta I$, will unequivocally be determined when the temperature sensor output $S_T$ is provided. In the ROM table 33D4 in the compensating circuit 33D of FIG. 17 there are written the amounts of correction of the bias current $\Delta I$ corresponding to individual values of the sensor output $S_T$ used as addresses; the amount of correction $\Delta I$ corresponding to the input value $S_T$ can be read out of the ROM table.

In the compensating circuit 33D of FIG. 17, the temperature $S_T$ detected by the temperature sensor 25D is converted by the AD converter 33D3 into a digital value, which is fed to as an address to the ROM table 33D4 to read out therefrom the corresponding amount of correction $\Delta I$. The amount of correction $\Delta I$ thus read out of the ROM table is converted by the DA converter 33D5 into an analog value, which is subtracted by the subtractor 33D2 from the preset bias current value $I_{Bi}$ to obtain a corrected bias current value. The corrected bias current value thus obtained is provided to the bias circuit 24, which generates the corresponding bias current.

In FIG. 17 the subtractor 33D2 may be interposed between the ROM table 33D4 and the DA converter 33D5 to perform a digital subtraction. In such an instance, the reference current setting circuit 33C outputs a digital reference current value $I_{Bi}$ corresponding to the random value $M_R$.

Figure 18:
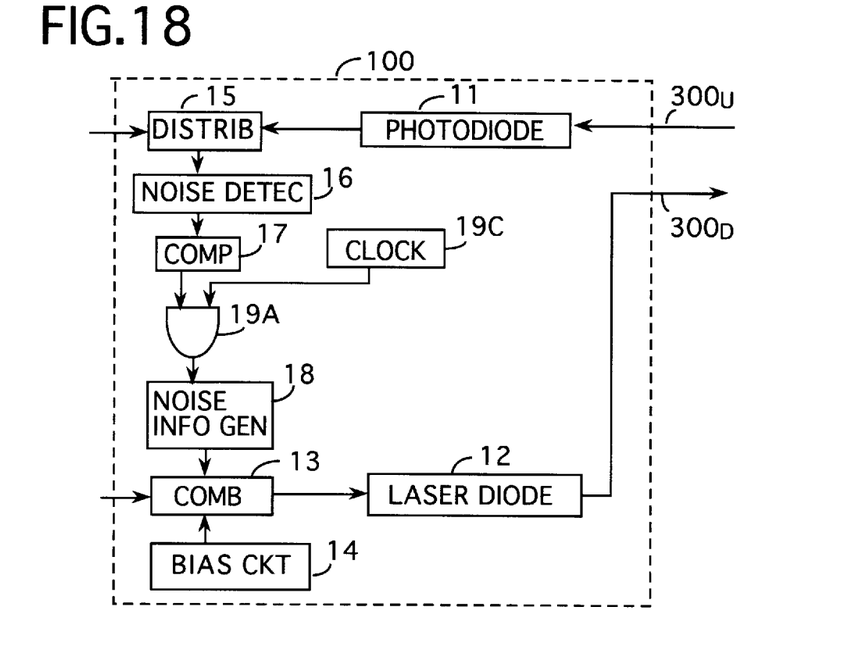
FIG. 18 is a block diagram illustrating a modified form of the base unit in the embodiment of FIG. 4.

FIG. 18 illustrates a modified form of the base unit 100. In this example the base unit 100 is provided with a clock circuit 19C, which is used to perform the above-described calibrating operation in a time period of the lowest traffic of use of the mobile communication system, for instance. The clock circuit 19C outputs an H-logic signal during a time zone from twelve to one o'clock midnight, for instance, to enable a gate circuit 19A to permit the passage therethrough of the detected output from the noise detector 16, performing the calibration only while the gate circuit 19A remains enabled.

By limiting the calibrating operation to a high traffic time zone as described above, it is possible to minimize the likelihood of communications being disabled by the calibration.

Figure 19:
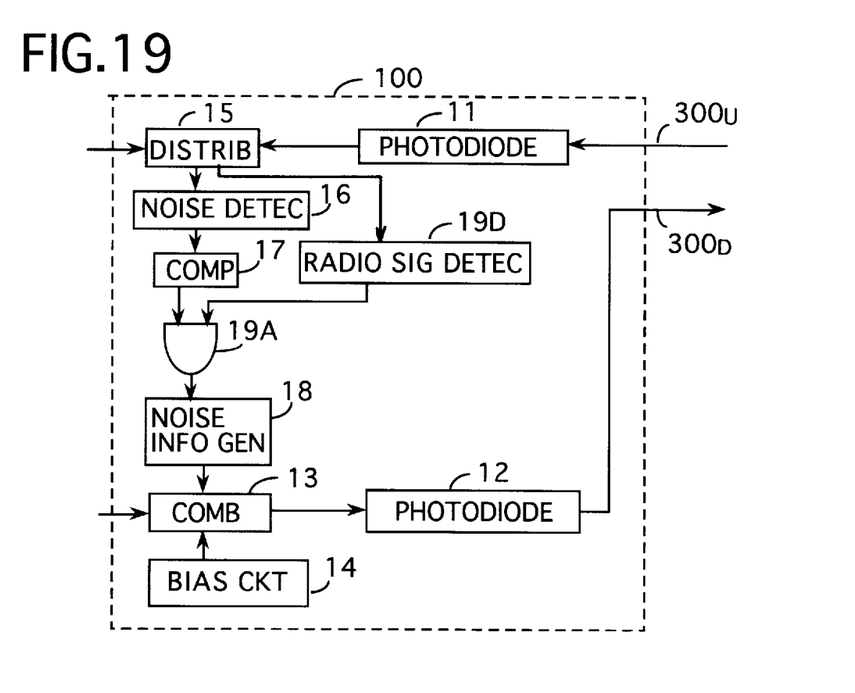
FIG. 19 is a block diagram illustrating another modification of the base unit.

FIG. 19 illustrates another embodiment of the base unit 100. In this embodiment the clock circuit 19A in FIG. 18 is replaced by with a radio signal detector 19D, which enables the gate circuit 19A only in the absence of radio signals, allowing the calibrating operation to take place. Accordingly, in this instance, the calibration is performed while no communication is being carried out, so that it is possible to maintain a highly reliable communication system which does not inconvenience users by the calibration.

Figure 20:
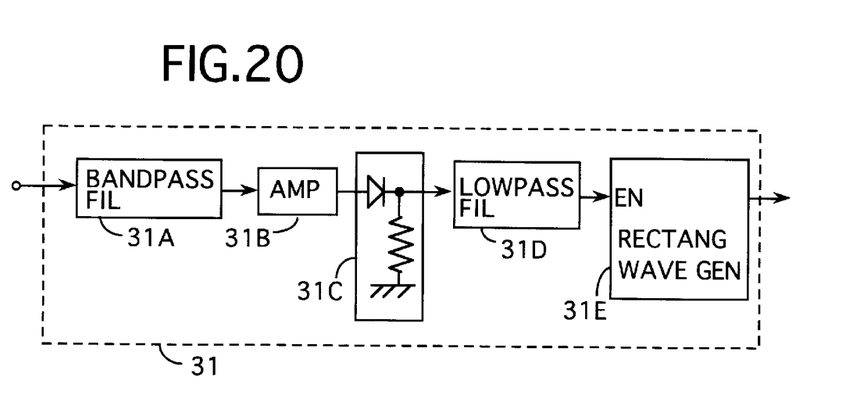
FIG. 20 is a block diagram illustrating an example of the noise information detector for use in each access unit when the base unit generates a continuous sine wave as a beat noise detected signal.

While in the above the noise information generating section 18 in the base unit 100 has been described to include the rectangular wave generator 18A (FIG. 8), it is not always necessary. That is, the noise information generating section 18 can be formed by only the sine wave generator 18B, in which case sine-wave noise information is continuously generated upon detection of the beat noise by the noise detector 16. In this instance, the noise information detector 31 (FIG. 10) of each access unit $200_i$ outputs a continuous "H" level.

Where the noise information generator 19 has such a configuration as mentioned above, a rectangular wave generator 31E is provided, as depicted in FIG. 20, at the output side of the low-pass filter 31D in the noise information detector 31 of each radio access unit $200_i$ shown in FIG. 10. When the output from the low-pass filter 31D goes "H" upon detection of noise information, the detection signal "H" is applied to the rectangular wave generator 31E to cause it to generate the rectangular signal of the period T, which is fed to the random signal generator 32.

Effect of the Invention

As described above according to the present invention, independently of variations in the actual oscillation wavelength of the laser diode forming the semiconductor laser device of each access unit, N evenly spaced temperature values (or evenly spaced bias current values) are predetermined for each laser diode so that they provide a wavelength spacing Δλ greater than the wavelength difference lest the beat noise should fall in the radio transmission band. As long as it is supplied with beat detected information, each access unit repeats randomly selecting any one of the N temperature values (or bias current values) and setting the laser diode of the semiconductor laser device at the selected temperature (or bias current).

Hence, the wavelengths of optical signals generated by the respective access units are certain to exceed the predetermined wavelength spacing Δλ. The number N of access units needed in a medium-sized underground shopping mall, for instance, is four or five at the greatest. Upon detection of the beat noise, each access unit begins to repeat random selection of the laser oscillation wavelength and the beat noise is reduced within several minutes at the longest. With such a configuration, it is unnecessary, in the construction of an optical transmission system, to measure the oscillation wavelength characteristics of a lot of purchased laser diodes so as to select those which are used in the respective access units.

According to the present invention, even if the oscillation wavelength of each of the laser diodes 25A in the radio access units $200_1$ to $200_N$ comes close to the oscillation wavelengths of the other radio access units due to a temperature change or aging, the beat noise resulting from the change in the oscillation wavelength is detected and the noise information is sent to the radio access units $200_1$ to $200_N$ over the down-link optical fiber line 300D. The noise information is used to update the random value that is provided from the random signal generator 32 in each of the radio access units and the random value is used to change the laser diode 25A. This configuration permits full automatic calibrating operation. Further, whenever the beat noise is generated, the calibrating operation is performed and is repeated until the beat noise is reduced, so that no maintenance is needed over a long term.

We claim:

1. A fiber optics transmission system which comprises: N radio access units each of which converts an up-link radio signal from a mobile radio, received by an antenna, into an up-link optical signal by means of a semiconductor laser device, converts a down-link optical signal intensity-modulated by a down-link radio signal into a down-link radio signal by means of a photodiode and transmits it to said mobile radio through said antenna, said N being an integer equal to or greater than 2; up-link and down-link optical fiber lines to which said N radio access units are connected in cascade; and a base unit which converts a down-link radio signal received from a control station into a down-link optical signal, provides it onto said down-link optical fiber line, converts an up-link optical signal received from said up-link optical fiber line into an up-link radio signal and transmits it to said control station; and wherein:

said base unit comprises a noise detector for detecting beat noise, and a noise information generating section for generating noise information representing the presence of beat noise during its detection and for sending said noise information to said N radio access unit over said down-link optical fiber line; and said radio access units each comprises a random signal generator for repeatedly generating a random value during the presence of said noise information, and a wavelength control circuit for controlling said semiconductor laser device to randomly select one of at least N wavelengths spaced a predetermined value or more apart in accordance with said random value.

2. A fiber optics transmission system which comprises: N radio access units each of which converts an up-link radio signal from a mobile radio, received by an antenna, into an up-link optical signal, converts an intensity-modulated down-link optical signal into a down-link radio signal and transmits it to said mobile radio through said antenna, said N being an integer equal to or greater than 2; up-link and down-link optical fiber lines to which said N radio access units are connected in cascade; and a base unit which converts a down-link radio signal received from a control station into a down-link optical signal, provides it onto said down-link optical fiber line, converts an up-link optical signal on said up-link optical fiber line into an up-link radio signal and transmits it to said control station;

said base unit comprising:

a first photodiode for converting said up-link optical signal on said up-link optical fiber line into an up-link radio signal;

noise detecting means for detecting the noise level in the output from said first photodiode and for determining if said noise level is higher than a predetermined level;

noise information generating means for generating noise information indicating the presence of noise while said noise level is determined to be higher than said predetermined value;

a first laser diode for emitting light to be provided onto said down-link optical fiber line;

a first bias circuit for applying a bias current to said first laser diode; and a first combining circuit for intensity-modulating said bias current from said first bias circuit to said first laser diode by said down-link radio signal and said noise information from said noise information generating means and for applying said intensity-modulated bias current; and said each radio access unit comprising:

a down-link optical coupler inserted in said down-link optical fiber line, for distributing a down-link optical signal;

a second photodiode supplied with said down-link optical signal distributed from said down-link optical coupler, for converting it into a radio signal;

an up-link optical coupler inserted in said up-link optical fiber line;

a semiconductor laser device having a second laser diode optically coupled with said up-link optical coupler;

an antenna for receiving an up-link radio signal from a mobile radio, or for transmitting a down-link radio signal from said second photodiode to said mobile radio;

a noise information detector supplied with said radio signal from said second photodiode, for detecting said noise information in said radio signal;

a random signal generator for generating, during the detection of said noise information by said noise information detector, at least N random values corresponding to at least N wavelengths of a predetermined spacing and for updating and holding said N random values with a predetermined period;

a wavelength control circuit for controlling the oscillation wavelength of said second laser diode in accordance with said random value held in said random signal generator;

a second bias circuit for applying a bias current to said second laser diode to oscillate it; and a second combining circuit for intensity-modulating said bias current from said second bias circuit by said up-link radio signal and for applying said intensity-modulated bias current to said second laser diode.

3. The fiber optics transmission system of claim 1 or 2, wherein said base unit includes a clock circuit which permits the generation of said noise information only in a predetermined time zone.

4. The fiber optics transmission system of claim 1 or 2, wherein said base unit includes a radio signal generator for detecting the absence of said radio signal from said first photodiode and for permitting the generation of said noise information by an absence detected signal.

5. The fiber optics transmission system of claim 1 or 2, wherein said semiconductor laser device of said each radio access unit includes a heat source element capable of generating and absorbing heat and thermally connected to said laser diode and a temperature sensor for detecting the temperature of said laser diode, and said wavelength control circuit includes a reference temperature setting circuit for selecting, based on said random value, one of at least N temperature values respectively corresponding to said at least N wavelengths and for outputting said selected temperature value as a reference temperature value and a heat source element control circuit for correcting said reference temperature value in accordance with the temperature of said laser diode detected by said temperature sensor and for providing said corrected reference temperature value to said heat source element to control its temperature.

6. The fiber optics transmission system of claim 5, wherein the number of said temperature values is larger than said N.

7. The fiber optics transmission system of claim 1 or 2, wherein said semiconductor laser device of said each radio access unit includes a temperature sensor for detecting the temperature of said laser diode, and said wavelength control circuit includes a reference current setting circuit for selecting, based on said random value, one of at least N bias currents respectively corresponding to said at least N wavelengths and for outputting said selected bias current value as a reference current value and a compensating circuit supplied with said reference current value, for correcting it in accordance with the temperature of said laser diode detected by said temperature sensor and for providing said corrected reference current value to said bias circuit.

8. The fiber optics transmission system of claim 7, wherein the number of said reference current values is larger than said N.

9. The fiber optics transmission system of claim 7, wherein said compensating circuit comprises: an AD converter for converting said temperature detected by said temperature sensor into a digital value; a memory having written therein bias correction amounts in a one-to-one correspondence with predetermined temperature values; and a subtractor for subtracting the bias correction amount read out of said memory from said selected reference current value and for providing it as a corrected reference bias current value to said bias circuit.

10. The fiber optics transmission system of claim 1 or 2, wherein said random signal generator comprises: a pseudo-random sequence generator driven by a rectangular wave signal indicating the presence of beat noise detected by said noise information detector, for generating a pseudo-random sequence; a shift register of at least K shift stages supplied with said pseudo-random sequence in synchronization with said rectangular wave signal; and a latch circuit for latching therein parallel K bits from said K shift stages of said shift register in synchronization with said rectangular wave signal, said K being the minimum integer which satisfies $2^K-1 \geq J$, where said J is the number of oscillation wavelengths selectable for each of said laser diode.

11. The fiber optics transmission system of claim 1 or 2, wherein said random signal generator of said each access unit has a clock generator for generating clock signals of different clock periods shorter than the period of said rectangular wave signal, a K-bit counter for counting clock signals from said clock generator and a K-bit latch circuit for latching therein the count value of said K-bit counter in synchronization with said rectangular wave signal, said K being the minimum integer which satisfies $2^K-1 \geq J$, where said J is the number of oscillation wavelengths selectable for each of said laser diodes.

* * * * *